VELOCITY OSCILLATOR

PRIMING AND RANGE PRESET CIRCUIT

United States Patent Office 3,716,858
Patented Feb. 13, 1973

3,716,858
DISTANCE MEASURING SYSTEM
William Douglas Worthington, Bramhall, England, assignor to Ferranti Limited, Hollinwood, Lancashire, England
Filed Apr. 6, 1971, Ser. No. 131,725
Int. Cl. G01s 9/14
U.S. Cl. 343—7.3       9 Claims

ABSTRACT OF THE DISCLOSURE

Distance measuring system employs a radar or similar source to produce a return signal from a target. Digital techniques are employed to produce and maintain a predetermined time relationship between the return signal and a variable gating pulse produced by the equipment. A distance indication is given when this predetermined time relationship is established.

This invention relates to distance measuring systems, and in particular to such systems responsive to radar or similar signals and incorporating digital techniques.

Distance measuring systems of the type referred to above exists in a relatively simple form, and comprise a digital counter which is started when a radar pulse, say, is transmitted and is stopped when a return echo is received. Systems of this type suffer from a number of limitations. Firstly, the accuracy of the systems depends upon the pulse repetition frequency of the clock pulse generator which drives the counter. For example a clock pulse generator operating at 10 mHz. produces one pusle every 0.1 µs. This represents a distance of fifty feet, which may be insignificant when measuring long distances, but may become very important at short range. A second, and far more serious, disadvantage with the simple system is that the received radar echo must be clearly distinguishable from the inevitable background noise in order to stop the counting cycle. Hence the signal-to-noise ratio must be fairly high. This is sometimes difficult to achieve, especially when measuring very long distances. A conventional analogue tracking loop may be locked on to a noisy signal and the position of the tracking gates measured digitally as above. This system could have a high accuracy read out, subject to the resolution of the clock pulse generator, but would otherwise have the limitations of a conventional tracking loop.

It is an object of the invention to provide a distance measuring system with a greater accuracy than has previously been possible with systems using a similar clock pulse frequency, and which will operate on received signals having a very poor signal-to-noise ratio.

According to the present invention there is provided a distance measuring system which includes a unidirectional cyclic digital counter pulsed by a clock pulse generator and operable to initiate a transmitted signal once in each counting cycle, a reversible cyclic digital counter pulsed by a variable-frequency oscillator, a comparator operable to compare the states of some or all of the bits of the unidirectional and reversible counters and to deliver output pulses when the compared bits of the two counters are in the required state, a gate pulse generator responsive to a signal representing the output of the comparator to generate at least one gating pulse in each counting cycle of the unidirectional counter, control means operable to control the frequency of the variable frequency oscillator and the direction of count of the reversible counter in dependence upon the relative timings of the gating pulse and a received signal resulting from each transmitted signal such that the gating pulse is maintained in a predetermined time relationship with respect to the appropriate received signal, and distance indicating means operable to display the measured distance as represented by the time interval between a datum time and the occurrence of an output from the comparator when a gating pulse and the appropriate received signal are in said predetermined time relationship.

An embodiment of the invention, employing radar as the ranging medium, will now be described with reference to the accompanying drawings, in which.

Figure 1:
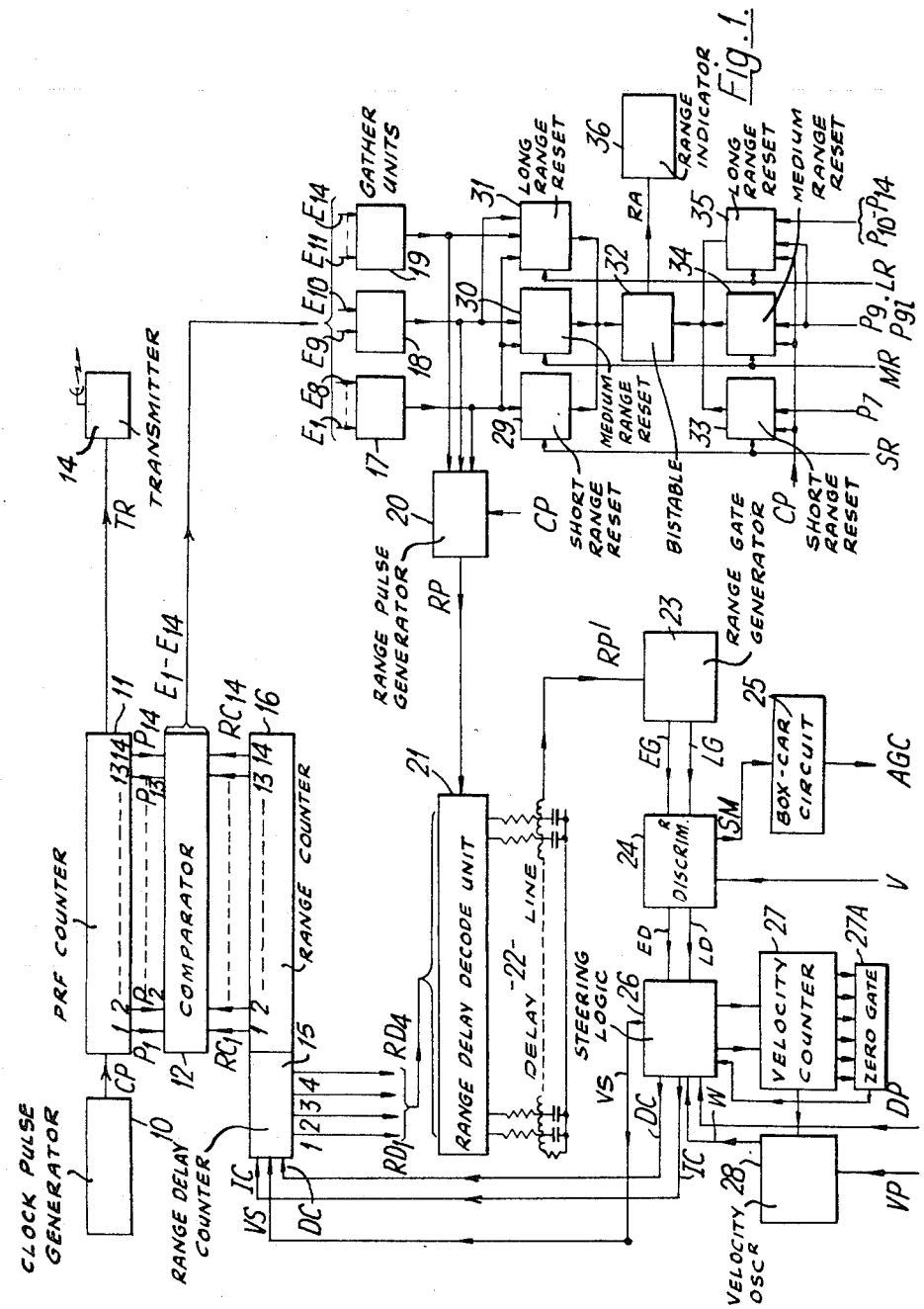
FIG. 1 is a block diagram of the distance measuring system.

In the drawings, inputs and outputs are denoted by one or two upper-case letters. These inputs and outputs may, at any particular time, be in either the "0" state or the "1" state. The logic used throughout is negative logic using NOR gates. It will be noticed that a number of gates are used purely to invert signals to the required state. Although each gate has a small inherent time delay, compensating delay units are not always illustrated; the use of these is well-known to a person skilled in the art.

The bistable units or flip-flops are all of the so-called J-K type. These have two stable states, each producing an output signal and each having two inputs. The two inputs, one for each state, shown in the drawings towards the centre of the symbol are the "shift" inputs. The other two inputs, usually connected together in the embodiment described, are the "inhibit" inputs. If the common inhibit input is absent, i.e., "0," then the removal of the shift input following its occurrence causes the flip-flop to change state. If however the inhibit input is present, then the removal of the shift input following its occurrence has no effect. The two outputs are denoted by say, F and F'.

Details of the actual circuitry for most of the system are not given, since this involves only conventional circuits.

References to the gates are given the symbol G followed by a number, the first digit of which indicates the figure in which the gate appears.

The following description will be divided into sections for simplifications. The section headings are as follows:

(1) Overall system
(2) Range Delay Counter
(3) Range and PRF counters and comparator.
(4) Range gating logic and delay line
(5) Range gate generator and discriminator.
(6) Velocity oscillator and steering logic.
(7) Modifications, etc.

(1) OVERALL SYSTEM (1.1) Description

Referring now to FIG. 1, this shows a block diagram of the equipment making up the complete system.

The operation of the entire system is controlled by a high-accuracy clock pulse generator 10, operating at a pulse repetition frequency (PRF) of, say, 10 mHz. providing an output CP. This output drives a unidirectional cyclic digital counter 11 having fourteen bits and hereafter referred to as the PRF counter. The counter 11 has outputs $P_1$ to $P_{14}$ and applies signals to a fourteen-bit comparator 12 having outputs $E_1$ to $E_{14}$. Once per counting cycle the counter 11 produces a trigger pulse TR which initiates a transmitted radar pulse from a transmitter 14.

Figure 4:
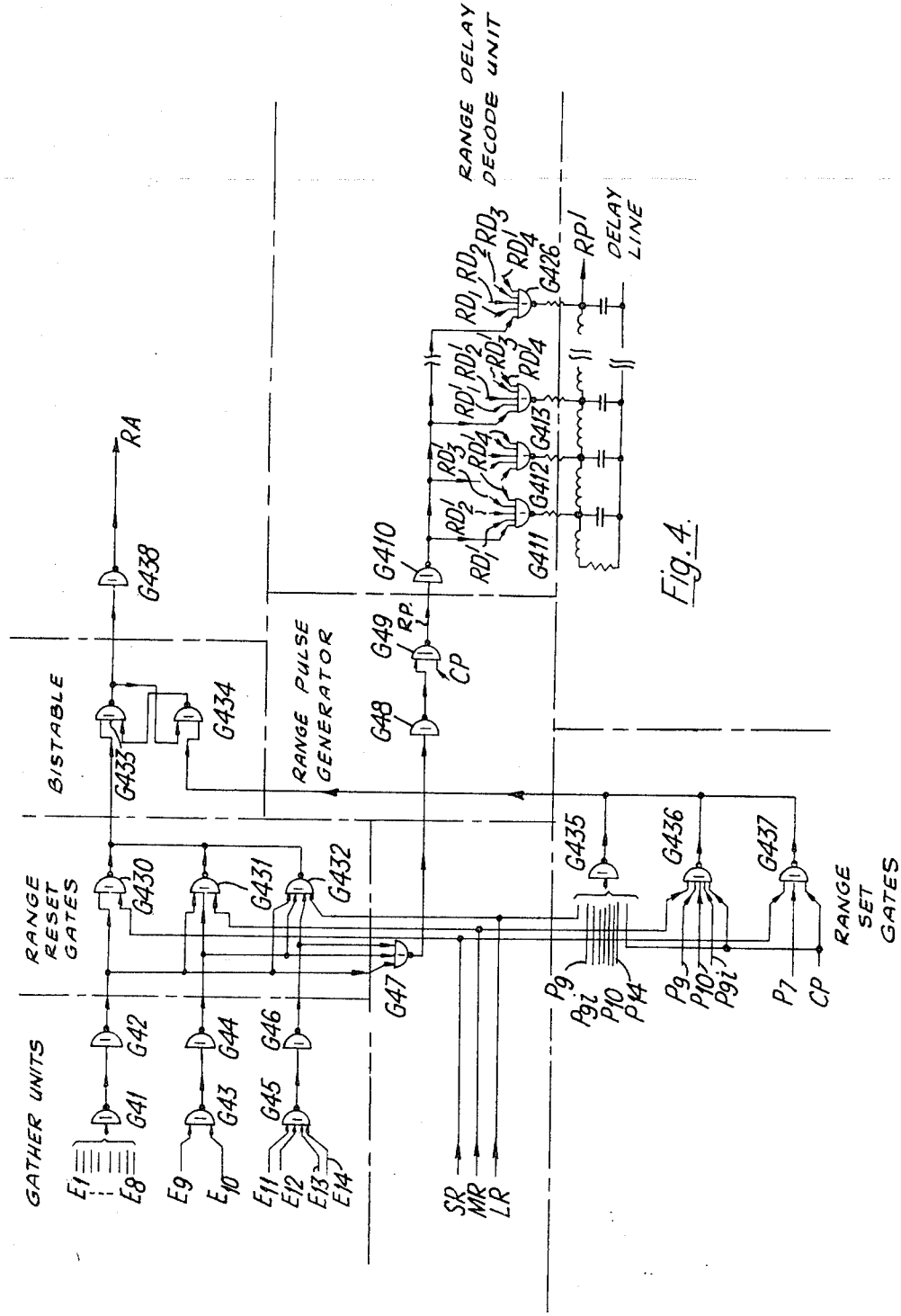
FIG. 4 shows a logic diagram of the tapped delay line and its input connections.

A reversible cycle digital counter is formed in two parts assembled as one and stepped by a signal VS derived as described below. The first four bits form the range delay counter 15 and the remaining fourteen bits form the range counter 16. The outputs $RC_1$ to $RC_{14}$ from the range counter are applied to the comparator 12 to be compared with the outputs from the PRF counter 11. The range delay counter 15 and range counter 16 cycle at a very much slower rate than the PRF counter, being advanced not more than one step for each complete cycle of the PRF counter. Hence not more often than once per cycle of the PRF counter, the comparator will deliver output signals due to the required number of bits of the PRF and range counters being identical. In order to enable the equipment to operate over several pre-determined ranges the output signals from the comparator are collected in three groups. Outputs $E_1$ to $E_8$ are gathered together by the first gather unit 17, outputs $E_9$ and $E_{10}$ by the second gather unit 18, and outputs $E_{11}$ to $E_{14}$ by the third gather unit 19. As shown in FIG. 4 and hereinafter described, each gather unit comprises a pair of gates, one having the appropriate inputs applied to it and the other being an invertor. The reason for this is that equivalence between the first eight bits of the two counters will occur more frequently than equivalence between a larger number of bits and may thus be used when operating the equipment to measure short ranges. Similarly, for the longest range, it is necessary to compare all the bits of the two counters.

The outputs from the three gather units 17, 18 and 19, together with clock pulses CP, are applied to a range pulse genator 20. This generates a single range pulse RP at a time depending upon the outputs from the gather units. The gather units 17, 18 and 19 and range pulse generator 20 form gating means for the comparator output. The timing of this pulse may vary in steps of 0.1μs., the cycle time of the clock pulse generator. The range pulse RP is applied to a range delay decode unit 21 which controls the application of the pulse to a delay line 22. The pulse is inserted into the delay line at a point determined by the time of its occurrence, as compared with the outputs $RD_1$ to $RD_4$ of the four bits of the range delay counter 15.

The range pulse RP' emerging from the delay line 22 is applied to a range gate generator 23. This produces, on two separate output lines, two range gating pulses referred to as the "early" range gate pulse EG and the "late" range gate pulse LG. These pulses are 0.1μs. wide and the trailing edge of the early pulse coincides with the leading edge of the late pulse. These two range gating pulses are applied to a discriminator 24 which also receives a video signal V corresponding to the received radar return echo. If there is overlap between the video signal V and either or both of the range gating pulses EG and LG, then the discriminator delivers a sum output SM, and may also deliver a difference output. If the video pulse overlaps the "early" range gating pulse EG to a greater extent than the "late" range gating pulse LG, then the discriminator delivers an "early" difference output ED. Conversely, if the greater overlap is between the video signal and the "late" range range gating pulse LG, then the discrminator delivers a "late" difference output LD. If the video signal is symmetrically located with respect to the two range gating pulses, then no difference output is obtained from the discriminator. The sum signal SM is applied to a boxcar circuit 25 which produces an AGC signal.

The appropriate difference pulse is applied to the steering logic unit 26 which controls the direction of count of the two reversible counters 15 and 16. The steering logic also controls the direction and rate of count of a velocity counter 27. The velocity counter in turn controls the frequency of oscillation of the velocity oscillator 28 and ensures, via the "zero" gate 27A that the steering logic 26 is able to change the direction of count of the reversible counter only when the output from the velocity counter is zero, that is when the velocity changes sign. The velocity counter 27 operates to select the required one of sixty-four rates of oscillation of the oscillator 28, the output W of which is applied via the steering logic 26 to form the input VS to the reversible counter 15. The steering logic 26, velocity counter 27 and zero gate 27A form the control means for the counting direction and speed of the reversible counters 15 and 16.

In addition to the automatic control of the counter 15 by way of the steering logic 26, it is also possible to apply manual control or "priming" to the apparatus. The direction prime signal DP applied to the steering logic 26 sets the direction of count of the reversible counter 15, whilst the velocity prime signal VP applied to the velocity oscillator 28 sets the frequency of oscillation to a value very much higher than any of the sixty-four values normally employed. The reason for these manual controls will be explained later.

The remaining parts of the equipment are the distance indicating means. The outputs from the three gather units 17, 18 and 19, as well as being connected to the range pulse generator 20, are also connected to three range reset gates 29, 30 and 31 respectively. The short range reset gate 29 has applied to it the output of the $E_1$ to $E_8$ gather unit 17 together with a short range signal SR. Similarly the medium ragne reset gate 30 has applied to it the output of the $E_1$ to $E_8$ gather unit 17, the output of the $E_9$ and $E_{10}$ gather unit 18 and a medium-range signal MR. Finally the long range reset gate 31 has applied to it the outputs of all three gather units and a long-range signal LR. The outputs of the three range reset gates are connected together to the "reset" input of a bistable circuit 32.

There are also three range set gates, each corresponding to one of the range reset gates 29, 30 and 31. The short range set gate 33 has applied to it a clock pulse CP, the short-range signal SR and the output $P_7$ from bit 7 of the PRF counter 11. The medium range gate 34 has applied to it the clock pulse CP, the medium-range signal MR and the $P_9$ output from bit 9 of the PRF counter 11. Finally the long range set gate 35 has applied to it the clock pulse CP, the long-range signal LR, the $P_9$ output, and also the $P_{10}$ to $P_{14}$ outputs from the PRF counter. The outputs of the three range set gates are connected together to the "set" input of the bistable circuit 32.

The bistable circuit is "set" by the appropriate set gate at a datum time determined by the inputs to that gate, and is subsequently "reset" by the appropriate reset gate in accordance with the output from the comparator 12. Hence the final analogue output RA obtained from the bistable circuit 32 is a square-wave of variable-mark/space ratio which represents the measured range as a function of the selected full-scale range. This is applied to a range indicator 36.

(1.2) Operation

Although a detailed description of the operation of the equipment described above will be given with reference to the remaining figures, it will be useful at the present stage to give a brief description of the operation of the overall system.

(1.2.1) Initial state

Before the equipment is switched on all counters will be empty, but on switching on they may initially assume any state. One of the range selection signals SR, MR or LR will have been selected, and the prime signals DP and VP may be on or off. The steering logic 26 may be set to steer the range delay counter 15 and range counter 16 either up or down, and the velocity counter 27 may cause the velocity oscillator to operate at any of its oscillation frequencies.

(1.2.2) No video input

The PRF counter 11 cycles continuously under control of the clock pulse generator 19, and initiates a transmitted radar pulse from the transmitter 14 once in each counting cycle. The range delay counter 15 and range counter 16 may together contain any number and will be counting up or down as determined by the steering logic 26 at a rate determined by the velocity counter 27 and velocity oscillator 28. The range counter 16 and PRF counter 11 will coincide periodically, resulting in outputs from the comparator 12. These outputs will reset the range output bistable circuit 32 periodically, and since the bistable circuit is set periodically by the PRF counter, a range output RA will be produced to give a range indication. An indication is, however, given to indicate that this range is spurious.

The outputs from the comparator 12 will also cause the range pulse generator 20 to produce a pulse RP, and this will be applied to the delay line 22 through the range delay decoder 21. The output RP' from the delay line is applied to the range gate generator 23 which produces the two contiguous gate pulses. Since no video signal V is present, the discriminator 24 will not produce either sum or difference output pulses, and hence the state of the steering logic 26, velocity counter 27 and velocity oscillator 28 will remain unchanged.

If manual prime inputs are applied, these will steer the range delay counter 15 and range counter 16 in the desired direction, and also set the velocity oscillator to its "prime" operating frequency so as to reduce the time interval between successive outputs from the comparator 12 as rapidly as possible.

(1.2.3) Video input present

The operator will usually have some indication of the existence of a target and its approximate range, and thus the range selection will be set accordingly. In order to obtain a true distance measurement as quickly as possible the manual prime condition will be selected. As already stated this causes the range delay counter 15 and range counter 16 to cycle at maximum speed in a preselected direction so as to move the range gating pulses relative to a time datum. However, so long as there is no overlap between the video pulse V and one or other of the range gate pulses EG and LG, there will still be no output from the discriminator 24.

As soon as one or other of the range gate pulses overlaps the video pulse V, the discriminator 24 will produce sum and difference output signals. The sum signal SM is applied to the box-car circuit 25, and the resulting AGC output causes the prime signals DP and VP to be disconnected from the steering logic 26 and velocity oscillator 28 respectively. The presence of the AGC signal also causes an indication to be given that the range now indicated by the output RA from the bistable circuit 32 is genuine, though at the present stage it may not be absolutely correct.

The difference output ED or LD from the discriminator is now applied to the steering logic 26 and causes the counters 15 and 16 to count up or down in dependence upon whether it is the early range gate pulse EG or the late range gate pulse LG which has overlapped the video pulse V. The discriminator output also causes the velocity counter 27 to be set to a state which allows the velocity oscillator to operate at a frequency which allows the range gate pulses to move slightly in time relative to the video input V. There is thus a servo tracking loop which operates so as to maintain the two range gating pulses displaced equally across the video pulse V. Since the target giving rise to the video pulse may well be moving relative to the distance measuring equipment, and moving in an irregular manner at that, then the steering logic and velocity counters may be changing frequently to maintain the range gating pulses in register with the received video pulse.

The indicated range from 36, to which output RA corresponds, will, of course depend upon the setting of the range selection signal. If, for example, the short range signal SR is applied, then the short range set and reset gates 33 and 29 respectively will function. Hence the bistable circuit will be set by output $P_7$ of the PRF counter and reset by the coincidence of bits 1 to 8 of the PRF and range counters, as denoted by outputs $E_1$ to $E_8$ from the comparator. Similarly if the long range setting signal LR is applied, then the bistable 32 is set by the range set gate 35 when inputs $P_9$ to $P_{14}$ are all present simultaneously, and is reset when all fourteen bits of the PRF and range counter coincide, as denoted by the outputs $E_1$ to $E_{14}$ from the comparator.

(2) RANGE DELAY COUNTER

(2.1) Description

Figure 2:
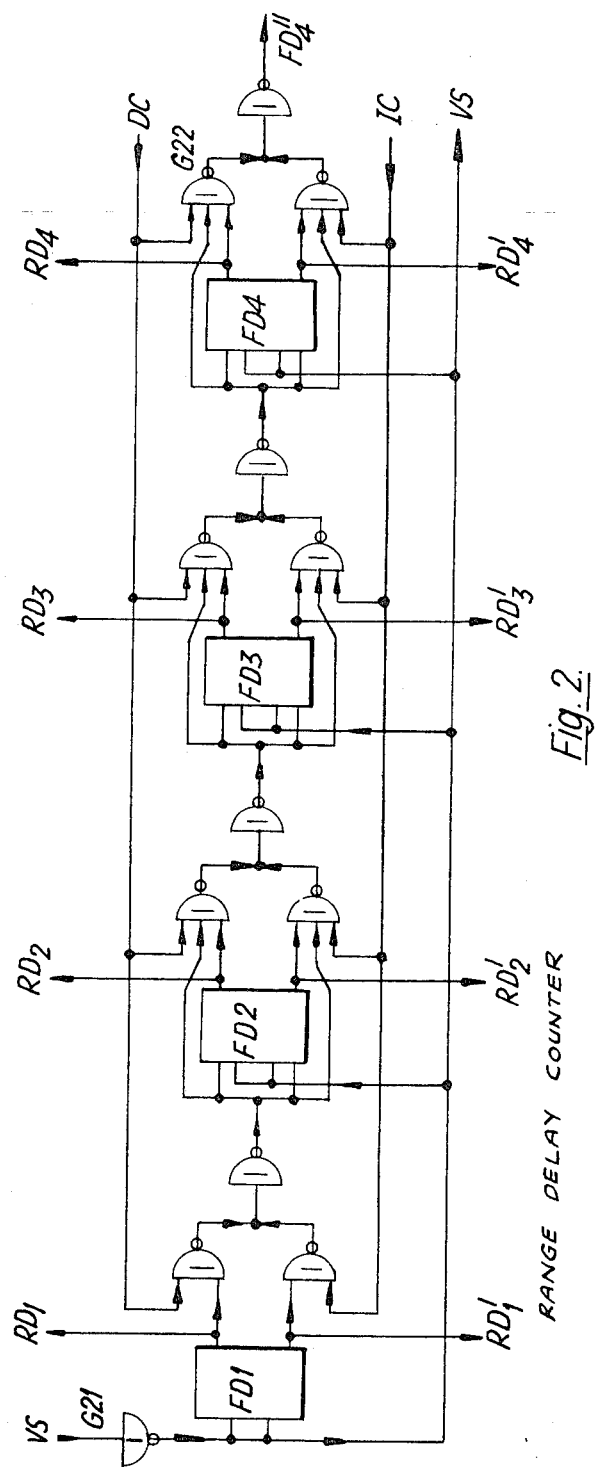
FIG. 2 shows a logic diagram of part of the reversible digital counter.

FIG. 2 is logic diagram of the range delay counter shown at 15 in FIG. 1.

The range delay counter is a conventional bidirectional synchronous counter having four J–K flip-flops FD1 to FD4. The shift input to each stage is obtained via a NOR gate G21 from the shift signal VS from the steering logic, as will be described later. Two outputs are taken from each flip-flop, these outputs being shown as $RD_1$ to $RD_4$ and $RD_1'$ to $RD_4'$ in FIG. 2. The final gate G22 of the counter is connected to the range counter of FIG. 3, the interconnecting signal being denoted by FD4''. The two steering lines of the counter carry "increase count" signals IC and "decrease count" signals to DC respectively, these signals being derived from the steering logic.

(2.2) Operation

The counter operates as a conventional bidirectional synchronous counter, and hence its operation will not be described in detail.

(3) RANGE AND PRF COUNTERS AND COMPARATOR

(3.1) Description

Figure 3:
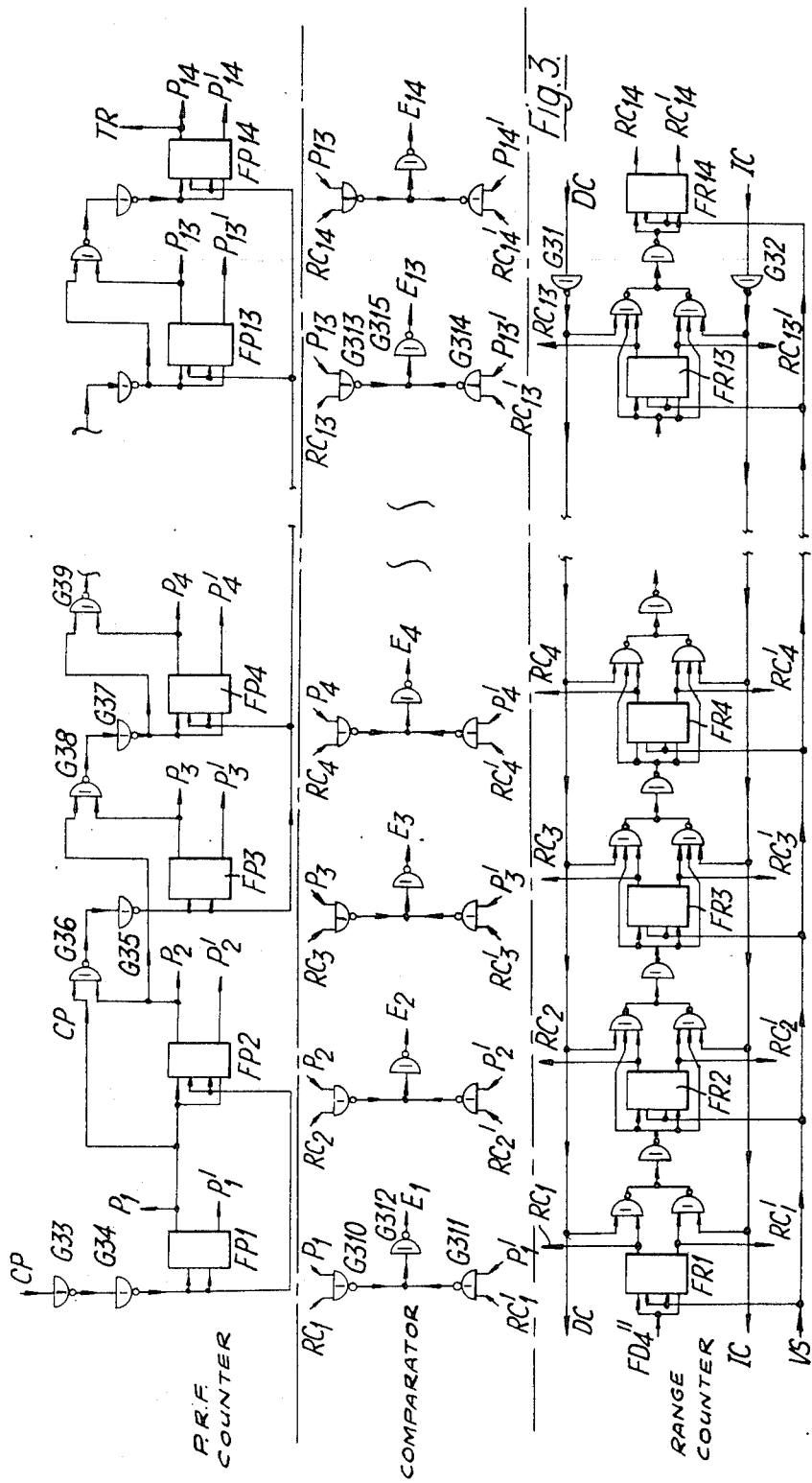
FIG. 3 shows a logic diagram of part of each of the unidirectional counter, comparator and reversible counter.

FIG. 3 shows a logic diagram of parts only of the range counter, PRF counter and comparator. The parts omitted are identical in form and interconnection to the preceding and succeeding parts.

The range counter is in fact a continuation of the range delay counter of FIG. 2, and comprises a further fourteen flip-flops FR1 to FR14, interconnected in exactly the same way as the four flip-flops of the range delay counter. The inhibit input applied to the first flip-flop FR1 is the FD4'' signal from the range delay counter, and the same shift signal VS and steering signals DC and IC are applied, the steering signals being derived from the steering logic via gates G31 and G32 respectively. No further description of the range counter is felt to be necessary.

The PRF counter is shown in the upper part of FIG. 3. The counter shown is a synchronous counter designed to have a particular cycle time, and the logic may be varied in order to obtain cycle times of any other value required.

The first flip-flop FP1 has its two shift inputs connected together and via two gates G33 and G34 to the clock pulse input CP, the two gates being provided to give a time delay equal to that experienced by the inputs to the other stages of the PRF counter. The two outputs from FP1 are $P_1$ and $P_1'$. The $P_1$ output is connected to the two inhibit inputs of the second flip-flop FP2, whilst the two shift inputs of FP2 are connected to the output of gate G34. FP2 provides two outputs $P_2$ and $P_2'$. The third stage flip-flop FP3 again has no inhibit inputs, the shift inputs being connected together and through an inverter gate G35 to a NOR gate G36 having applied to it the CP pulse from the clock pulse generator and the $P_1$ and P signals from FP1 and FP2 respectively. The two outputs from FP3 are $P_3$ and $P_3'$ respectively. All the remaining stages of the PRF counter have their shift inputs connected to the output of gate G35. The first two stages FP1 and FP2 are hence shifted at the clock rate via G34, and the remaining stages FP3 to FP14 at one-quarter of this rate via G36 and G35. This allows ample time for the "carry" to "ripple through" the counter, but still enables the counter to function as a synchronous counter as all essential shifting pulse edges are delayed by two gates on the clock pulse rate CP.

The flip-flop FP4 has its inhibit inputs connected together to the output of an inverter gate G37, the input of which is formed by the output of a two-input gate G38, which has as its input the $P_2$ and $P_3$ signals from FP2 and FP3 respectively. Each flip-flop from FP5 onwards has its inhibit inputs connected through an inverter gate to a two-input gate to which are applied the "0" output of the preceding stage and the inhibit input to the same stage. For example the inhibit inputs to FP5 are connected through an inverter gate to two-input gate G39, the latter having its inputs connected to the $P_4$ output from FP4 and the inhibit input to FP4 from G37. This form of interconnection applies to the remainder of the counter. FP14 also has its $P_{14}$ output connected as the trigger pulse TR to the radar transmitter.

The comparator comprises fourteen sets of gates, each set consisting of two two-input gates having their output commoned and applied to an inverter gate. For example, the first comparator stage comprises a gate G310 to which are applied the $P_1$ pulse from $FP_1$ and the $RC_1$ pulse from FR1. A second gate G311 has applied to it the $P_1'$ and $RC_1'$ pulses from the same stages of the PRF range counters respectively. The outputs of gates G310 to G311 are connected together and to the input of inverter gate G312, the output of which is the $E_1$ signal. The other stages of the comparator are similar, for example one gate G313 of the thirteenth stage has the $P_{13}$ and $RC_{13}$ pulses applied to it whilst the other gate G314 has the $P_{13}'$ and $RC_{13}'$ pulses applied to it. The output from the invertor gate G315 is the $E_{13}$ signal.

(3.2) OPERATION (3.2.1) Range counter

The range counter operates in exactly the same way as the range delay counter described in section 2, and no further description will be given.

(3.2.2) PRF counter

The first two stages of the PRF counter operates at clock pulse frequency. The clock pulse CP is applied via gates G33 and G34 to the shift inputs of FP1 and FP2. If, initially, the number in each stage of the counter is zero, then the $P_1$, $P_2$, $P_3$ etc. outputs will all be in the "1" state. Hence FP2 will be inhibited by the $P_1$ output. Similarly, FP4, FP5 and all subsequent stages will have inhibit inputs applied from the previous stage. FP3 has no inhibit input connections, but may only shift when the $P_1$ and $P_2$ stages are both in the "0" state, owing to the connection of gate G36. For the same reasons no shift input is applied to any of the later stages.

Initially, therefore, the appearance of the clock pulse changes the shift inputs of FP1 and FP2 from the "1" state to the "0" state. As with the range delay counter, this has no effect, but the subsequent return to the "1" state causes the flip-flop FP1 to shift. This removes the inhibit input to FP2 since the $P_1$ signal changes from "1" to "0". The other stages are unable to respond to shift inputs for the same reasons as above. The next clock pulse has the same results as the same results as the previous one, except that FP2 is now also able to shift, so that the number in the counter changes from 0001 . . . . to 0010 . . . . The $P_1$ output from FP1 reverts to the "1" state, whilst the $P_2$ output from FP2 changes to the "0" state. FP4 is still inhibited since the $P_3$ output is still in the "1" state, and no shift is applied to FP3 or subsequent stages because the $P_1$ output has reverted to the "1" state.

The third clock pulse therefore shifts only FP1, changing its output $P_1$ to the "0" state, and changing the number in the counter to 0011 . . . .

At this point outputs $P_1$ and $P_2$ are both in the "0" state. Gate G36 is therefore controlled by the clock pulse input alone, such that the next clock pulse applies a shift pulse to FP3 and all subsequent stages, as well as being applied to FP1 and FP2. However stages FP4 onwards are inhibited by the output of each preceding stage. The next clock pulse results in FP1, FP2 and FP3 changing state, the outputs $P_1$, $P_2$ and $P_3$ becoming "1," "1" and "0" respectively, and the number in the counter changing to 0100 . . . .

The counter continues to operate in the above manner, any particular stage being able to change state only when all preceding stages denote a "1" in the number in the counter.

(3.2.3) Comparator

The comparator operates to give outputs in the "0" state only when the compared stages of the PRF counter and of the range counter are in the same state. For example, if the $P_1$ output from FP1 and $RC_1$ output from FR1 are both in the "0" state, then the complementary outputs $P_1'$ and $RC_1'$ must be in the "1" state. Hence the output of gate G310 would be "1" whilst the output of G311 would be "0". Thus the $E_1$ output would be in the "0" state. Similarly, if the $P_1$ and $RC_1$ outputs are both in the "1" state then the $E_1$ output is again "0". If, however, the two counter stages are not in the same state, then both G310 and G311 would give a "0" output, and the $E_1$ output would be in the "1" state. Hence the comparator operates such that each gate output $E_1$, $E_2$ etc. is in the "0" state when the compared stages of range and PRF counters are in the same state.

(4) RANGE GATING LOGIC AND DELAY LINE (4.1) Description

FIG. 4 shows the gather units 17 to 19, range pulse generator 20, range delay decoder and delay line 21 and 22 and also the range set and reset gates 29 to 35 of FIG. 1.

Each gather unit comprises a pair of gates, one having the appropriate inputs applied to it and the other being an invertor. For example, gate G41 has the $E_1$ to $E_8$ outputs from the comparator applied to it, and its output is connected to the invertor gate G42. Similarly gate G43 has the $E_9$ and $E_{10}$ pulses from the comparator applied to it, and is connected to gate G44. Finally the third gather unit comprises gate G45 having the $E_{11}$ to $E_{14}$ pulses applied to its inputs, and having its output connected to an invertor gate G46.

As will be seen from FIG. 1, the outputs from the three gather units are gated with clock pulses CP to produce a range pulse RP. In FIG. 4 this is done in two stages. The outputs of gates G42, G44 and G46 are connected to the inputs of a gate G47, and the output of this gate is applied via invertor gate G48 to a further gate G49 where it is gated with the clock pulses CP.

The range pulse thus produced is applied via a further invertor gate G410 to the range delay decoder. This comprises sixteen five-input NOR gates G411 to G426. The other four inputs of each gate are derived from the outputs of the range delay counter shown in FIG. 2. The inputs to the gates are arranged in a binary sequence. The outputs of the sixteen gates as applied to tapping points on a delay line having a total delay of 0.1$\mu$s. The range pulse RP' emerging from the relay line is applied to the range gate pulse generator (23, FIG. 1).

The remainder of the logic shown on FIG. 4 is the range set and reset gating arrangement. The short range reset gate (29 in FIG. 1) is gate G430, having as its two inputs the output of G42 and the short range signal SR.

The medium range reset gate is G431, having three inputs. These are the output of G42, the output of G44, and the medium range signal MR. Similarly the long range reset gate is G432, to which are applied the outputs of all three gather units from G42, G44 and G46, and also the long range signal LR. The outputs of the three range reset gates are connected together to one input of one of a pair of cross-coupled gates G433 and G434, functioning as the bistable circuit 32 of FIG. 1.

The range set gates are shown as G435, G436 and G437. The short range set gate G435 has applied to it the short range signal SR, the clock pulses CP, and the $P_7$ output from the PRF counter. The medium range gate G436 has as its input the medium range signal MR, clock pulses CP, the $P_9$ and $P_{10}$ outputs from the PRF counter and the input to $FP_9$, denoted by $P_{9i}$. Finally the long range set gate G437 has applied to it the long range signal LR, clock pulses CP, the $P_{9i}$ input of the PRF counter and outputs $P_9$ to $P_{14}$ of the PRF counter. The outputs of the three range set gates are connected together to one input of the other of the two cross coupled gates G433 and 434.

As shown in FIG. 4, the other input of each of the pair of cross-coupled gates is derived from the other gate of the pair. The final output RA is taken via an invertor gate G438 to the range indicator (not shown).

(4.2) OPERATION (4.2.1) Range pulse generation

The operation of the range pulse generating logic is quite independent of the range to which the equipment is set.

When all the inputs to G41 are in the "0" state, that is when each of the first eight stages of the PRF counter is in the same state as the corresponding stage of the range counter, then the output of G41 is in the "1" state. The invertor gate G42 thus applies a "0" state to one input of G47 and to one input of G430. Similarly, when the $E_9$ and $E_{10}$ inputs to G43 are in the "0" state, G44 applies a "0" to a second input of G47 and to one input of G431. Finally when the $E_{11}$ to $E_{14}$ inputs to G45 are all in the "0" state, G46 causes a "0" to be applied to the third input to G47 and also to one input of G432. Thus when, and only when, there is coincidence between all fourteen stages of the PRF and range counters will the output from G47 be in the "1" state. At all other times the output from G47 will be "0". The "1" state output occurs only once in each cycle of the PRF counter.

The output from G47 is inverted by G48 and then gated with the clock pulse CP by G49. At coincidence, the pulse input to G49 is in the "0" state, and when the clock pulse arrives, changing the other input to G49 from the "1" state to the "0" state and back, a "1" state output pulse is produced from G49 having the same duration as the clock pulse. Invertor G410 restores the pulse obtained, the range pulse, to a "0" state output which is applied to all sixteen gates G411 to G426 of the range delay decoder.

At any one instant only one of the sixteen gates will have all four of its inputs from the range delay counter in the "0" state. All the other gates will have one or more of the inputs in the "1" state. When the range pulse appears, the fifth input of the selected gate also becomes "0" and hence the gate delivers a pulse of the same duration as the range pulse, and this pulse is applied to the delay line in the form of a change of state from "0" to "1" and back to "0".

For example, if at the instant that the range pulse appears the range delay counter contains the number 0000, then the four inputs to G411 from the range delay counter will all be in the "0" state. The range pulse, input also changes to the "0" state on the occurrence of the pulse, and thus the output of G411 changes to the "1" state. When the range pulse disappears, the output from G411 reverts to the "0" state. Thus the range pulse, though in inverted form, is applied to the beginning of the delay line, and it emerges at the other end after the full delay of 0.1 $\mu$s. If, however, the number in the range delay counter when the range pulse appears is 0010, then the four inputs to G413 from the range delay counter will be in the "0" state, and the range pulse will be applied to the delay line through G413. It will therefore emerge from the delay line after a shorter interval of time than in the previous case considered.

(4.2.2) Range gating

As has been described above, inputs are applied to the range reset gates G430, G431 and G432 from the corresponding invertor gates G42, G44 and G46, in accordance with the outputs of the gather gates. Thus one input of G430 is in the "0" state every time there is coincidence between the first eight stages of the PRF and range counters. However, the output of gate G430 will only change to the "1" state when the range input also is in the "0" state, that is when the SR signal is applied. Similarly the output of gate G431 will only change to the "1" state when the first ten stages of the PRF and range counters are in coincidence and the MR signal is also present. The third range reset gate G432 will only change its output to the "1" state when all fourteen stages of the two counters are in coincidence and the LR signal is present.

When one of these three conditions is satisfied, the input to G433 from the range reset gates changes to the "1" state.

The range set gates G435, G436 and G437 operate in a similar manner. One of the three range signals SR, MR or LR is applied to each gate, together with appropriate inputs from the PRF counter. All three range set gates have the clock pulse input applied to them, and also appropriate ones of the outputs from the PRF counter. For example, the output of the range set gate G437 will change to "1" when the $P_7$ output from the PRF counter changes to "0" in coincidence with a clock pulse CP and with the SR signal applied. The output of gate G436 will change to "1" when the MR signal is applied and the clock pulse CP coincides with the $P_9$, $P_{9i}$ and $P_{10}$ signals all changing to "0". Finally the output of G435 will change to "1" when the LR signal is applied and the clock pulse coincides with the signals $P_{9i}$ and $P_9$ to $P_{14}$ all being "0". The particular inputs applied to these three range set gates have been chosen to give particular values of maximum indicated range, and may be changed if other range values are preferred.

The outputs of the three range set gates are connected to one input to G434.

The two cross-coupled gates G433 and G434 form a bistable device. Consider the situation when the bistable device is in the "reset" state, that is the output from G433 is "0", and hence the RA output from G438 is "1". In the absence of the appropriate inputs to the range set and reset gates, the two outputs from these will be in the "0" state. Hence G434 will have a "0" input from the range set gates and a "0" input from the output of G433. The output of G434 will thus be "1". This is applied to one input of G433, and along with the "0" input from the range reset gates, the output from G433 will be in the "0" state. The device is thus stable in this state.

The appearance of a "1" output from the range reset gates would have no effect, since the bistable device is already in the reset state. Thus the application of a second "1" input to G433 would not change the output from that gate.

If, however, the input of G434 from the range set gates changes to "1", then the output from G434 will change to "0." Hence the two inputs to G433 will both be "0," and the gate output will change to "1." This applies a second "1" input to G434 to maintain the "0" output when the input from the range set gates reverts to "0." The RA output from G438 thus changes to "0."

The reverse change occurs when a subsequent reset pulse is applied from one of the range reset gates.

(5) RANGE GATE GENERATOR AND DISCRIMINATOR

The units shown at 23, 24 and 25 in FIG. 1 constitute the range gate generator, discriminator and box-car circuit respectively. These are not shown in detail in the drawings though their operation is described below.

The range gate generator is used to produce two contiguous pulses each 0.1 μs. wide in response to the RP pulse applied from the delay line. These two pulses, the EG and LG pulses, are then applied to the discriminator along with the video signal, if any. Current diversion switching is employed in the discriminator. The video signal controls the current flowing in a circuit, this current flowing in one or the other of two transistor collectors during the early and late gating pulses respectively and to a sink at all other times. The current charges one or the other of two capacitors, and the voltage appearing across these is clamped after a short time. The signal appearing across the capacitors is therefore a pulse whose amplitude is proportional to the amplitude and to the displacement of the video signal from the centre of the range gating pulses, and whose duration may be about two orders greater than the video signal. The voltage pulse is buffered with circuits arranged to determine the sum and the difference of the two pulses. The difference channel is "stretched" with a long time constant, say five times the pulse repetition period, and then sampled with a short duration pulse. The sample is therefore either positive or negative depending upon the direction of time displacement in the range gates. Samples below a certain threshold amplitude are ignored; longer samples cause monostable circuits to generate the ED or LD discriminator pulses depending upon the polarity of the sample. The trigger threshold level determines the width of the "dead space" of the discriminator. Typically it may be about twice the range increment, i.e., about six feet in the equipment described.

The sum channel is likewise "stretched" to a longer pulse, and the modulation envelope is derived from it with a box car circuit. An A.G.C. signal is obtained by comparing the sum pulse with a reference pulse of the same duration. The current caused by the difference between these two pulses flows into or out of a capacitor, and thus the error is integrated directly. The voltage appearing across the capacitor may be used for A.G.C. purposes. As the error signal is derived from pulse waveforms and is integrated directly many of the problems usually incurred with A.G.C. loops using a D.C. reference are avoided.

(6) VELOCITY OSCILLATOR AND STEERING LOGIC

(6.1) Description

Figure 5:
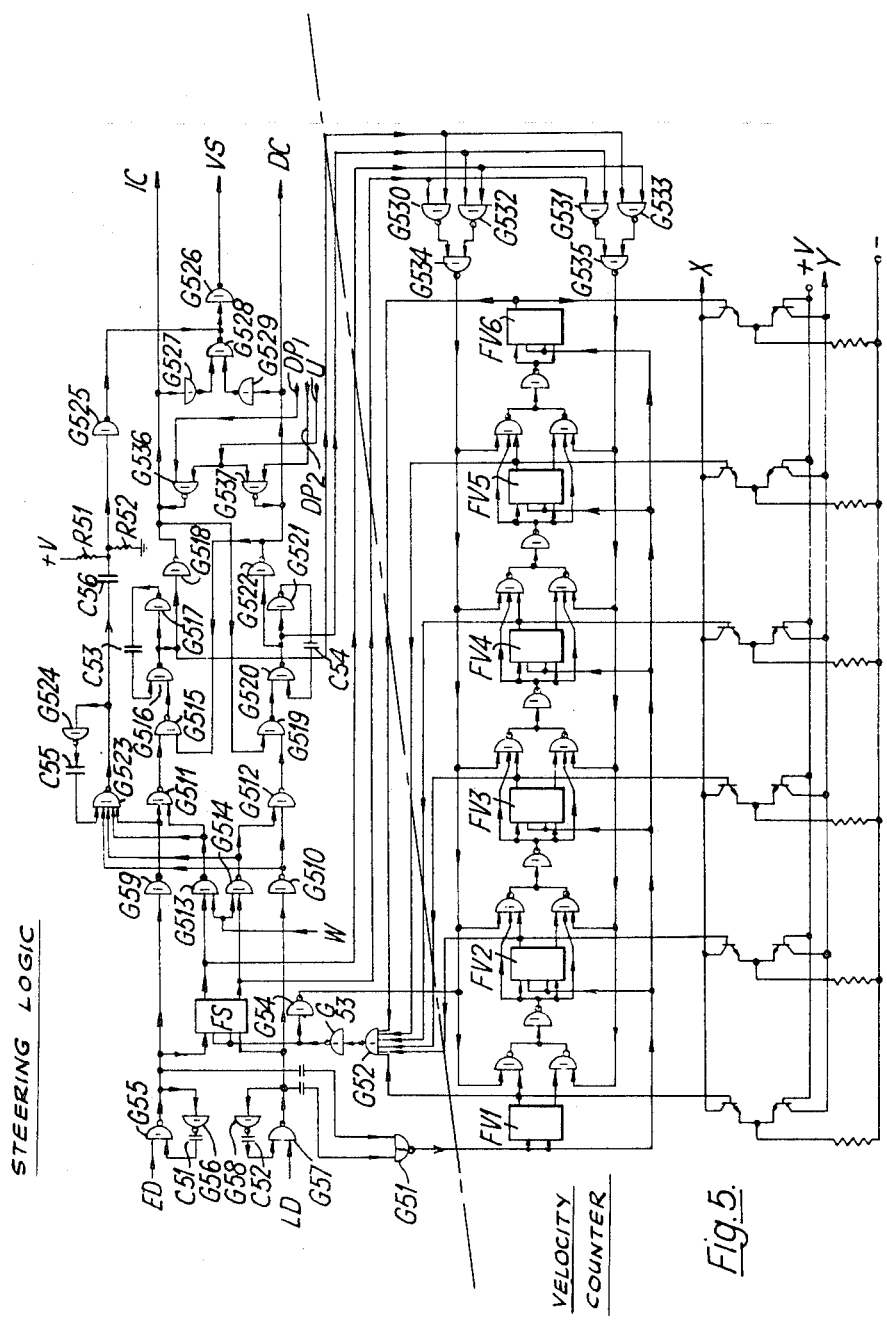
FIG. 5 shows a logic and circuit diagram of the control means for controlling the variable-frequency oscillator and reversible counter.
Figure 6:
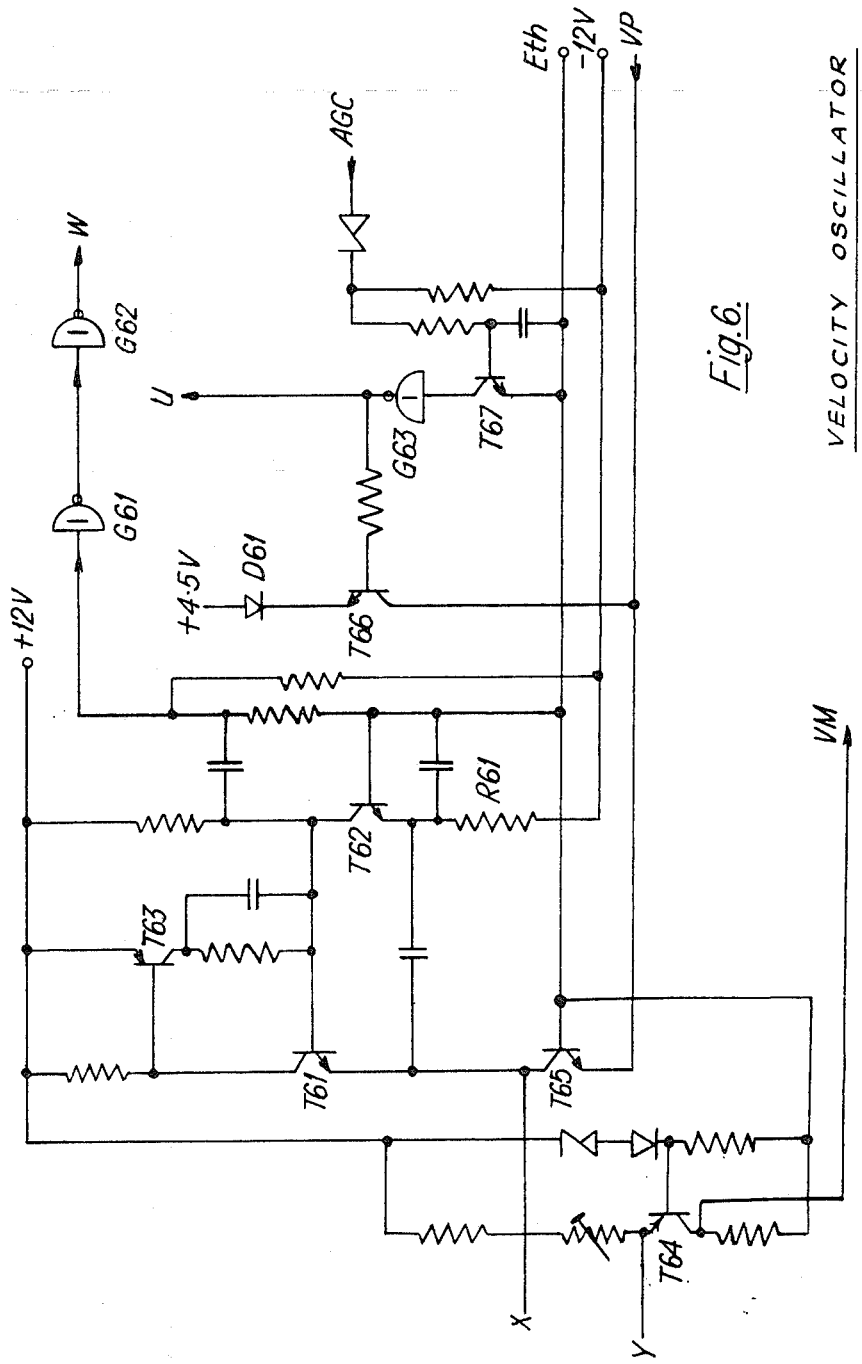
FIG. 6 is a circuit diagram of the variable-frequency oscillator.

FIGS. 5 and 6 show the velocity oscillator, velocity counter and the steering logic for the reversible range delay and range counters.

The velocity counter is a conventional six-stage reversible counter having flip-flops FV1 and FV6. The counter is connected in exactly the same way as the range delay and range counters, the shift input being applied to all stages of the counter via a gate G51 having each one of its two inputs coupled to a separate monostable device connected to the ED and LD discriminator outputs. Only one output is taken from each stage of the counter, and each is connected to an input of a six-input NOR gate G52, the "zero" gate. The output of this is connected through an invertor gate G53 to the steering logic to be described later, and also through a further invertor gate G54 to one steering line of the velocity counter. Each output of the velocity counter is also connected to the base of one transistor of a long-tailed pair, the tail resistors of the six long-tailed pairs being in binary ratio. The collector of one transistor of each pair is connected to a common line X, and the collector of the other transistor of each pair is connected to a common line Y. The base of each other transistor of each pair is connected to a positive potential equal to the positive logic threshold, whilst the remote end of each tail resistors is connected to astable negative supply.

The common lines X and Y are connected to the velocity oscillator, a circuit diagram of which is shown in FIG. 6. Basically the oscillator is an emitter-coupled multivibrator, using transistors T61 and T62. Transistor T62 draws its current through R61 from a negative potential, whilst T61 draws current over line X through one or more of the tail resistors of the long tailed pairs. T61 draws a very much lower current than T62, and hence a further transistor T63 is added to assist the regeneration at very low current values. The output of the oscillator is taken from the oscillator via two gates G61 and G62 over lead W.

Lead Y carries a current which is the complement of that on lead X, and a transistor T64 is provided to enable an indication to be given of the frequency of the oscillator at any particular instant by means of a monitor signal VM.

The steering logic for the range delay and range counters is built up around two steering lines, to one of which is applied the early discriminator output ED and to the other of which is applied the late discriminator output LD. The outputs from the discriminator are connected into monostable circuits as mentioned above. One of the monostable circuits comprises two gates G55 and G56 and coupling capacitor C51, whilst the other monostable circuit comprises gates G57 and G58 and coupling capacitor C52. The outputs of the two monostable circuits are connected through capacitors to the two inputs of G51.

The output of G55 is connected to the input of inverter gate G59 and to one inhibit input of a steering flip-flops FS. Similarly the output of G57 is connected to the input of inverter gate G510 and to the other inhibit input of FS. The output of G59 is connected to one input of G511, whilst the output of G510 is connected to one input of G512. Flip-flop FS has its shift inputs connected to the output of G53, and has each of its two outputs connected to one input of a separate two-input gate G513 and G514 respectively. To the other input of each of these last-mentioned gates is connected lead W carrying the velocity oscillator output. The output of G513 is connected to the other input of G511, whilst the output of G514 is connected to the other input of G512.

The output of G511 is applied through a two-input gate G515 to a monostable circuit comprising gates G516 and G517 and capacitor C53. The output of the monostable circuit is connected through inverter G518 to the IC steering line. In a similar manner, the output of G512 is applied through a two-input gate G519 to a monostable circuit comprising gates G520 and G521 and capacitor C54. The output of the monostable circuit is connected through inverter gate G522 to the DC steering line. The IC steering line is also connected to the other input of G519, and the DC steering line is connected to the other input of G515.

In order to obtain the shift input VS for the range delay and range counters the outputs of gates G59, G510, G513 and G514 are connected to four inputs of a five-input gate G523. This gate is connected to form a monostable circuit with gate G524 and capacitor C55, and the output of G523 is connected through a differentiating circuit comprising C56, R51 and R52, and through gates G525 and G526 to the VS line. The IC line is connected through an inverter gate G527 to one input of a gate G528, and the DC line is connected through an inverter gate G529 to the other input of G528. The output of G528 is connected to the input of G526.

The velocity counter steering logic is considerably simpler than that for the range delay and range counters. Each of the velocity counter steering lines derives its signals from the output of a two-input gate, each input of which is connected to the output of a further two-input gate. The inputs to the last-mentioned gates are derived from the main steering logic. For example, one output from flip-flop FS is connected to one input of a gate G530 and to one input of a further gate G531. Similarly the other output from FS is connected to one input of gate G532 and also to one input of gate G533. The second inputs of G530 and G533 are connected to the output of G516 whilst the second inputs of G532 and G531 are connected to the output of G520. The outputs of G530 and G532 are connected to the two inputs of a gate G534, the output of which is connected to one steering line of the velocity counter. Similarly, the outputs of G531 and G533 are connected to the two inputs of a gate G535, the output of which is connected to the other velocity counter steering line.

The remaining features of FIGS. 5 and 6 are the arrangements for manually controlling the direction and frequency of the velocity counter and velocity oscillator, referred to as the "prime" facility.

The frequency of the oscillator is increased on the application of the velocity prime signal VP, by the action of a transistor T65 (FIG. 6) which has the VP signal applied to its emitter and having its collector connected to the supply line X. Also connected to the VP line is the collector of a transistor T66, having its emitter connected through a diode D61 to a positive potential and having its base connected to a line U connected to the steering logic. Line U is also connected through an inverter gate G63 to a transistor T67 controlled by the AGC signal from the box-car circuit.

The line U is connected to the direction priming logic of FIG. 5. Two two-input gates G536 and G537 are provided for this purpose, one having its output connected to the IC line and the other having its output connected to the DC line. The line U is connected to one input of each of these two gates. The other input of gate G536 is connected to a $DP_1$ signal from the priming circuit, whilst the other input of G537 is connected to a $DP_2$ signal from the priming circuit.

Figure 7:
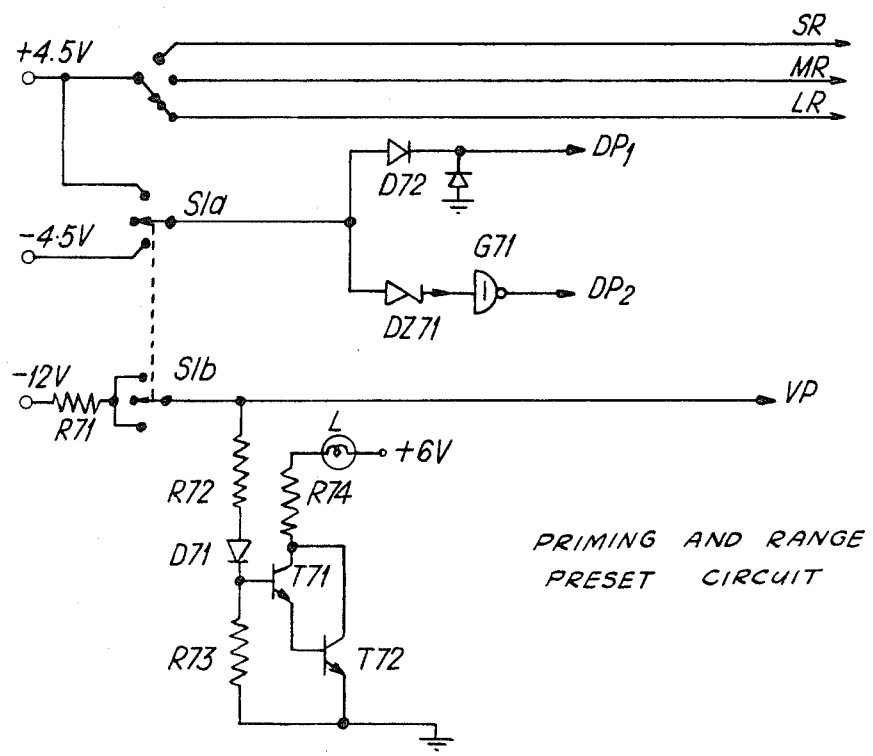
FIG. 7 shows some of the auxiliary circuits of the system.

The priming circuits are shown in FIG. 7, and are simply arrangements for applying the appropriate DC potentials to the velocity and direction prime inputs. The velocity and direction prime potentials are controlled by a double-pole three-way switch S1a and S1b, having a central OFF position. In either of the other positions the VP lead is connected through a resistor R71 to a negative potential. The direction prime part of the switch in one position connects a positive potential through a diode D72 to the $DP_1$ input of G536, and, the other position of the switch connects a similar negative potential through a Zener diode DZ71 and an inverter gate G71 to the $DP_2$ input of G537.

Connected to the VP line through a resistor R72 and diode D71 is the base of a transistor T71, being also connected through a further resistor R73 to earth potential. The emitter of T71 is connected to the base of a further transistor T72 having its emitter connected to earth potential and its collector connected to that of T71. The collector of T71 is also connected through a resistor R74 and lamp L to a positive potential.

(6.2) Operation—No discriminator output (6.2.1) Velocity counter

The velocity counter itself operates in exactly the same manner as the range delay counter described in section 2.2 and a further detailed description will not be given. The operation of the velocity counter steering logic will be described later.

The outputs from the six stages of the velocity counter determine which of the associated long-tailed pairs will be conducting. This in turn determines which of the tail resistors are connected to the common line X and are thus able to supply current to the velocity oscillator. The six counter outputs are also connected to the inputs of a gate G52 the output of which is applied to the shift input of flip-flop FS through gate G53 when all stages of the velocity counter are set to "0."

(6.2.2) Velocity oscillator

As already stated, the oscillator shown in FIG. 6 is a form of emitter-coupled multivibrator, using transistors T61 and T62. The resistor R61 is made much lower than the combination of tail resistors supplying T61 so that the current through T62 is much higher than that through T61. This enables the period of the whole cycle of oscillation to be closely controlled by the current through T61, and hence by the velocity counter. As has been stated above, transistor T63 is provided to assist the regeneration at the very low currents actually employed. The actual oscillator output applied to G61 is in the form of a short pulse which is shaped by G61 and inverted by G62 so that in the quiescent state the output of G62 is in the "1" state, changing to the "0" state and back on the appearance of an output pulse. This output, W, is applied to the main steering logic as described below. The function of the other components of FIG. 6 is described in section 6.2.6 below.

(6.2.3) Main steering logic

The steering logic for the range delay and range counters is shown in the upper part of FIG. 5. As stated previously the IC and DC steering line of the counters are maintained in the "1" state during quiescent periods. However, owing to the inversion carried out by G31 and G32 on FIG. 3, the steering lines shown on FIG. 5 will normally be in the "0" state. When a shift pulse VS occurs, one steering line is pulsed with a pulse which starts before, and finishes after, VS. This ensures that the counter counts in the right direction.

In the absence of any output from the discriminator, both the ED and LD lines are in the "0" state. The gates G55 and G57 therefore both give "1"-state outputs. These inhibit the steering flip-flop FS. Due to the capacitive coupling to the two inputs of G51, both inputs are maintained in the "0" state, giving a "1" output on the shift line to the velocity counter. This is the normal quiescent state. G59 applies a "0" input to G511, and G510 also applies a "0" input to G512. The flip-flop FS must be set in one state or the other; assume therefore that the output applied to G513 is in the "1" state and that to G514 is in the "0" state. The oscillator output, when quiescent, is in the "1" state so that gate G513 applies a "0" to the other input of G511. The output from G511 is therefore a "1." G514 has one of its inputs in the "0" state, and the other in the "1" state, and hence its output applied to G512 is "0". The input from G512 is therefore "1." Gate G515 has two inputs applied to it, the input from G511 being "1." Thus, regardless of the state of the other input, the output from G515 will be "0." This is applied to the trigger input of the monostable circuit including gates G516 and G517, the output from this circuit in the quiescent state being "1." This is inverted by G518 to put the steering line IC in the "0" state as required.

In a similar manner, the output from G512 is "1," and hence the output from G519 will be "0," regardless of the state of its other input. Hence the trigger input to the monostable circuit comprising G520 and G521 will be "0." The output from this circuit will be "1," which is inverted by G522, and hence the DC line is in the "0" state as required.

(6.2.4) Velocity counter steering

As shown in FIG. 5, the velocity counter steering is controlled by gates G530 to G535. One input to each of these is taken from the main steering lines, and the other from the flip-flop FS. For example, one input of G530 and G533 is taken from the IC line monostable circuit and is in the "1" state. Similarly one input of G531 and G532 is taken from the DC line monostable circuit and is also in the "1" state. The other input to G532 and G533 is taken from the flip-flop FS and is in the "1" state, whilst the other input to G530 and G531 is taken from the other output of the flip-flop FS and is in the "0" state. Hence the outputs of all four gates are in the "0" state, and each velocity counter steering line is in the "1" state.

(6.2.5) VS shift output

The VS shift output is derived from the outputs of the four gates G59, G510, G513 and G514. When there are no discriminator output pulses and no oscillator pulse is present, the outputs of all four gates are "0." Hence the trigger input to the monstable circuit comprising G523 and G524 is also "0" and the monostable circuit is quiescent, its output being "1." The differentiating network C56, R51, R52 blocks an output from the monostable circuit and ensures that the input to G525 is held in the "0" state. The output of G525 is thus normally in the "1" state, and this condition is inverted by G526 to put the VS line in the "0" state. This is the required state since a further inversion is performed by G21 in FIG. 2 before the input is applied to the range delay and range counters.

Gates G527, G528 and G529 are operable to block the VS output if the two steering lines IC and DC should both be put into the "1" state, since under these conditions the subsequent counters would not function correctly.

Although the quiescent state is being considered, and it has been assumed above that no pulses are applied from the velocity oscillator, this is in fact an over-simplification. The velocity oscillator is functioning continuously at a fixed frequency in the absence of any shift input to the velocity counter. Thus the input line W to gates G513 and G514 has pulses applied to it periodically. Each of these pulses has the effect of changing the associated input to the "0" state for the duration of the pulse. At G513 one of the inputs is still "1," from the flip-flop FS, and hence the output of the gate will not change. However, the output of G514 will change to "1" when both inputs become "0." The output of G512 will therefore change to "0" and the output of G519 to "1." The output of G519 triggers the monostable circuit comprising G520 and G521 so that its output changes to "0," and hence the output of G522 changes to "1" for a time determined by the value of C54. The DC steering line thus changes to "1" for the duration of the monostable circuit output pulse. The steering pulse is further inverted and applied to the counters to allow a subsequent VS pulse to decrease the number in the counter. The state of the DC line is applied to one input of G515 and ensures that the IC line cannot change state. The "0" output from the monostable circuit is also applied to one input of gates G531 and G532. One input of G532 remains in the "1" state, and hence the output of G532 and the state of the upper velocity counter steering line does not change. However, when the input to G531 changes to "0," the output changes to "1," and hence G535 changes the state of the lower velocity counter steering line to "0" for the duration of the pulse. Since there is no output from the discriminator, there is no shift input to the velocity counter, and no change occurs.

Since the output of G514 changes for the duration of the oscillator pulse, one input of G523 changes state, and the monostable circuit of G523 and G524 is triggered. Its output changes to "0" and the pulse is differentiated by the RC network and changes the state of the input of G525 to "1." This is inverted by G526 and a pulse changing from "0" to "1" and back is applied to the VS line. The VS pulse is slightly delayed to ensure that the appropriate steering pulse is present before the arrival of the VS pulse.

Each successive velocity oscillator output pulse has the same effect, and the range delay and range counters will count in direction determined by the state of the steering flip-flop FS.

(6.3) Operation—Primed condition

As has already been stated, the prime inputs will be applied when no video signals are received which are in register with the EG and LG range gating pulses. The prime inputs do not affect the velocity counter or its steering.

(6.3.1) Velocity oscillator

The velocity prime signal VP is in fact a current applied through switch S1b on FIG. 7. This current allows transistor T65 to conduct and provides the current source for the velocity oscillator. The current available is considerably greater than that provided by the tail resistors, and hence the velocity oscillator oscillates at a frequency very much higher than is normal operating frequencies. The effect of the oscillator output pulses is as described in section 6.2.5 above.

It is also possible to control the direction of count of the range delay and range counters by means of direction prime signals. The direction prime is controlled by gates G536 and G537. Transistor T67 is normally conducting, and the output from G63 is "0," holding T66 off. The input on line U to these two gates is "0" in the quiescent state, and with no $DP_1$ or $DP_2$ inputs, the other input of each gate is in the "1" state, giving a "0" output from each gate. Hence the "1" pulses from the monostable circuits take precedence and control the steering lines accordingly.

If switch S1a on FIG. 7 is placed in the upper position a positive potential is applied to the diode D72 and the Zener diode DZ71. The Zener diode does not conduct, and hence no $DP_2$ signal is applied to G537. However, diode D72 does conduct, and the $DP_1$ signal changes the input of G536 to the "0" state. The output of G536 changes to "1" and changes the state of the IC line to "1." As a result of the cross-connections, one input of G519 is changed to "1" accordingly, and this prevents the monostable circuit from being triggered by the appearance of an oscillator pulse. This prevents the oscillator pulse from changing the state of the DC line in the manner described above. Thus the direction prime over-rides the steering set by the flip-flop FS. The shift pulse VS is still derived as described above.

Similarly, if the switch S1a is placed in the lower position, a negative potential is applied to the Zener diode ZD71 and diode D72. D72 does not conduct, but the Zener diode conducts and changes the input to G71 to the "1" state. The $DP_2$ signal is thus in the "0" state, and this changes the input to G537. The output from G537, and hence the DC steering line, changes to "1." As before, the cross-connection prevents the monostable circuit comprising G516 and G517 from being triggered, should flip-flop FS change state. The effect of this prime input is to over-ride the steering already provided by the flip-flop FS.

As a result of the velocity prime signal VP, the current through resistor R72 and diode D71 on FIG. 7 is sufficient to prevent T71 from conducting, and hence the lamp L does not light. This indicates that any range indication given is spurious.

(6.4) Operation—Video present

The appearance of a video input to the discriminator in register with the EG and/or LG range gate pulses has two effects. The sum output from the discriminator results in an AGC signal from the box-car circuit, and the difference output appears as either the ED or LD pulse from the discriminator. The AGC signal itself has two effects. Transistor T67 is turned off, and hence the output of G63 changes to "1." This blocks gates G536 and G537 and hence removes the direction prime from the steering lines, allowing the steering to revert to the control of flip-flop FS or the discriminator outputs. Also as a result of T67 being turned off, T66 conducts and acts as a current sink to divert the VP priming current. The velocity oscillator then reverts to being controlled by the velocity counter. The diversion of the priming current allows T71 to conduct, thus causing T72 to conduct and lighting the lamp L. This indicates that the equipment is locked on to video pulses.

There are now pulses being applied from the discriminator; whether the ED or LD pulse is applied depends upon which of the EG and LG pulses is coincident with the video pulse. Assume initially that the ED pulse is applied from the discriminator. This pulse triggers the G55–G56 monostable circuit, and changes the output to the "0" state for a brief period determined by the value of C51. This pulse removes the "1" from the upper input to the flip-flop FS. The shift input to the flip-flop is still "1," however, since at least one of the stages of the velocity counter will apply a "1" input to G52, and hence the flip-flop will not change state. The "0"-state output from the monostable circuit is applied to G59, changing its output to "1." The output of G511 thus changes to "0," regardless of whether an oscillator output pulse is present or not. The input to G515 changes to "0," changing the output to "1" and triggering the G516–G517 monostable circuit. The output of this is applied through G518 to the IC line which thus changes to the "1" state for the duration of the pulse from the monostable circuit. The cross-coupling from the IC line to G519 prevents an oscillator output pulse from changing the DC steering line to the "1" state.

The change in the output of G59 causes a trigger pulse to be applied to the G523–G524 monostable circuit, and a shift pulse is generated on the VS line.

Due to the change in state of the IC line, the velocity counter steering is also pulsed through G530 and G534, changing the upper steering line of the velocity counter to the "1" state.

The output from the G55–G56 monostable circuit causes the gate G51 to have a "1" applied to one input, and this causes a shift input to be applied to the velocity counter, thus increasing the number in the velocity counter and hence changing the frequency of the velocity oscillator.

This situation will be repeated for such time as the ED signal is applied from the discriminator. When the video signal and the range gating pulses come into register, the rate of oscillation of the velocity oscillator will be such that the range gating pulses will still be moving relative to the video pulse and hence an LD pulse will be applied from the discriminator. This will function in a similar manner to the ED pulse, except that the DC line will change to the "1" state, as will the lower velocity counter steering line, thus reducing the frequency of oscillation of the velocity oscillator.

The steering logic thus operates as a servo loop, operating to control the direction and rate of count of the range delay and range counters such that the EG and LG range gate pulses are maintained in register with the video pulse.

If the count in the velocity counter becomes such that the output of each stage is "0," then the output from G52 changes from "0" to "1" and hence the input to the flip-flop FS changes to "0." This allows the flip-flop to change state if the next pulse to appear from the discriminator is the ED pulse, since then the only input to the flip-flop which is in the "1" state is that connected to the G57–G58 monostable, and the flip-flop will change state. When the count in the velocity counter reaches this value, the velocity oscillator ceases to function, since none of the long-tailed pairs is conducting. The gate G54 is provided to ensure that the upper velocity counter steering line is set to "1" under these circumstances, so that the velocity counter counts upwards. Otherwise, if the counter could count down, the number in the counter could change from 000000 to 111111, and hence change the oscillator frequency from zero straight to its maximum value.

It will be seen from the above description that the steering lines IC and DC and shift output VS are controlled from either of two sources. One is the velocity oscillator, with steering controlled by the steering flip-flop FS, and the other is the discriminator output which steers the range delay and range counters irrespective of the state of the flip-flop FS.

(7) MODIFICATIONS ETC.

It has been assumed throughout the above description that the distance measuring system was used in conjunction with a radar system, initiating and receiving radar pulses. This is only one way in which the system may be used. Other types of radiation may be used, such as that radiated by a laser source. Another alternative is to use a transmitted radio signal to interrogate a transponder which in turn transmits a "reply." In such a case the "video" input considered above would be replaced by the received radio signal, or by a signal derived from it. It will be necessary to allow in the equipment for the inherent delay in the transponder itself.

Other uses for the system will be apparent.

As has already been stated, the cycle times of the range and PRF counters may be modified to suit particular requirements, as may the discrete values of velocity oscillator frequency and other variable factors. Other facilities not mentioned in the above description may be provided by the equipment described.

The clock pulse frequency of 10 mHz. mentioned, itself gives a distance increment of approximately 50 feet. The use of the tapped delay line which forms a feature of this invention decreases this increment to approximately three feet. This increment may be further reduced by using, say, a 50 mHz. clock pulse generator in conjunction with a delay line having a total delay of 20 ns. In such a case the distance increment would be about seven and a half inches. If such a clock pulse frequency is used, with the appropriate high-speed logic, then it may be unnecessary to use the range pulse delay line 22.

In place of the "early" and "late" range gating pulses referred to above, it is possible to use only a single gating pulse, in which case the ED and LD outputs of the discriminator depend upon the time relationship between the gating pulse and the received video signal.

What I claim is:

1. Distance measuring system which includes a clock pulse generator, a unidirectional cyclic digital counter pulsed by the clock pulse generator, a signal transmitter operable to transmit a signal under the control of the counter once only in each counting cycle, a variable-frequency oscillator, a reversible counter pulsed by the variable-frequency oscillator, a comparator operable to compare the states of such or all of the bits of the unidirectional and reversible counters and to deliver output pulses when the compared bits of the two counters are in the required state, a gate pulse generator responsive to a signal representing the output of the comparator to generate at least one gating pulse, control means operable to control the frequency of the variable frequency oscillator and the direction of count of the reversible counter in dependence upon the relative timings of the gating pulse and a received signal resulting from the transmitted signal such that the gating pulse is maintained in a predetermined time relationship with respect to the received signal, and distance indicating means operable to display the measured distance as indicated by the time interval between a datum time and the occurrence of an output from the comparator when the gating pulse and the received signal are in said predetermined time relationship.

2. System as claimed in claim 1 which includes gating means responsive to the outputs of the comparator, and a tapped delay line to which each output of the gating means is applied at a tapping point determined by the state of the reversible counter, the output of the delay line forming input of the gate pulse generator.

3. System as claimed in claim 2 which includes a discriminator to which each gating pulse and the appropriate received signal may be applied and operable to deliver one or the other of two output pulses in dependence upon the sense and magnitude of the departure of the gating pulse and the received signal from the said predetermined time relationship.

4. System as claimed in claim 3 in which the control means comprise steering logic responsive to the one or the other discriminator output pulses to control the direction of count of the reversible cyclic digital counter, and a subsidiary reversible counter controlled by the said discriminator outputs and by the steering logic to determine the frequency of oscillation of the variable frequency oscillator.

5. System as claimed in claim 4 in which the variable frequency oscillator includes a plurality of impedances each connected through a switch to a current source, each switch being controlled by the subsidiary counter to determine the frequency of oscillation of the variable frequency oscillator.

6. System as claimed in claim 1 in which the distance indicating means includes a bistable circuit set repetitively by pulses from the unidirectional counter at a rate determined by the range setting of the equipment and reset repetitively by the appropriate outputs of the comparator.

7. System as claimed in claim 1 which includes manually-operated means for controlling the direction of count of the reversible cyclic digital counter and the frequency of oscillation of the variable-frequency oscillator.

8. System as claimed in claim 1 in which the gate pulse generator is so constructed and arranged as to produce pairs of gating pulses separated by a time interval, the control means being so constructed and arranged as to maintain each received signal equidistant from the two associated gating pulses.

9. System as claimed in claim 1 in which the signal transmitter is so constructed and arranged as to transmit radar signals.

References Cited

UNITED STATES PATENTS

| | | | |
|---|---|---|---|
| 3,075,189 | 1/1963 | Lisciky | 343—7.3 |
| 3,246,324 | 4/1966 | Price | 343—7.3 |

T. H. TUBBESING, Primary Examiner

U.S. Cl. X.R.

343—5 DP